Figure 2A:
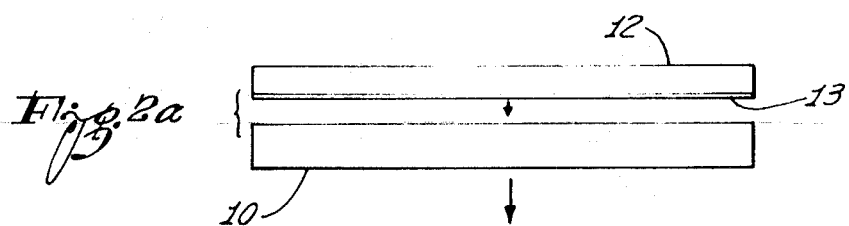

United States Patent

[11] 3,622,825

[72] Inventor Grant S. Bennett
San Mateo, Calif.
[21] Appl. No. 809,683
[22] Filed Mar. 24, 1969
[45] Patented Nov. 23, 1971
[73] Assignee Litton Systems, Inc.
San Carlos, Calif.

[54] MOSAIC ACOUSTIC TRANSDUCER FOR CATHODE-RAY TUBES
15 Claims, 6 Drawing Figs.

[52] U.S. Cl. .................................................. 313/66,
313/329, 340/10, 313/73, 340/5 MP
[51] Int. Cl. ..................................................... H01j 31/49,
H04b 11/00, H01j 31/08
[50] Field of Search ........................................... 313/65 A,
94, 65 AB, 66; 317/237, 73

[56] References Cited
UNITED STATES PATENTS

| | | | |
|---|---|---|---|
| 3,325,777 | 6/1967 | Fyler .......................... | 313/66 X |
| 3,013,170 | 12/1961 | Sheldon ...................... | 313/65 S |
| 3,321,657 | 5/1967 | Granitsas et al. ............ | 313/73 |
| 3,424,932 | 1/1969 | Sheldon ...................... | 313/73 |

Primary Examiner—Robert Segal
Attorneys—Alan C. Rose, Alfred B. Levine, Ronald W. Reagin and Ronald M. Goldman ABSTRACT: A transducer mosaic includes a plurality of spaced transducers formed with piezoelectric material for converting incident ultrasonic energy into an electrical signal. The piezoelectric is supported on one side by a pressure release barrier, suitably a conductive syntactic foam. The syntactic foam material is a mixture of miniscule hollow glass balls and conductive epoxy resin.

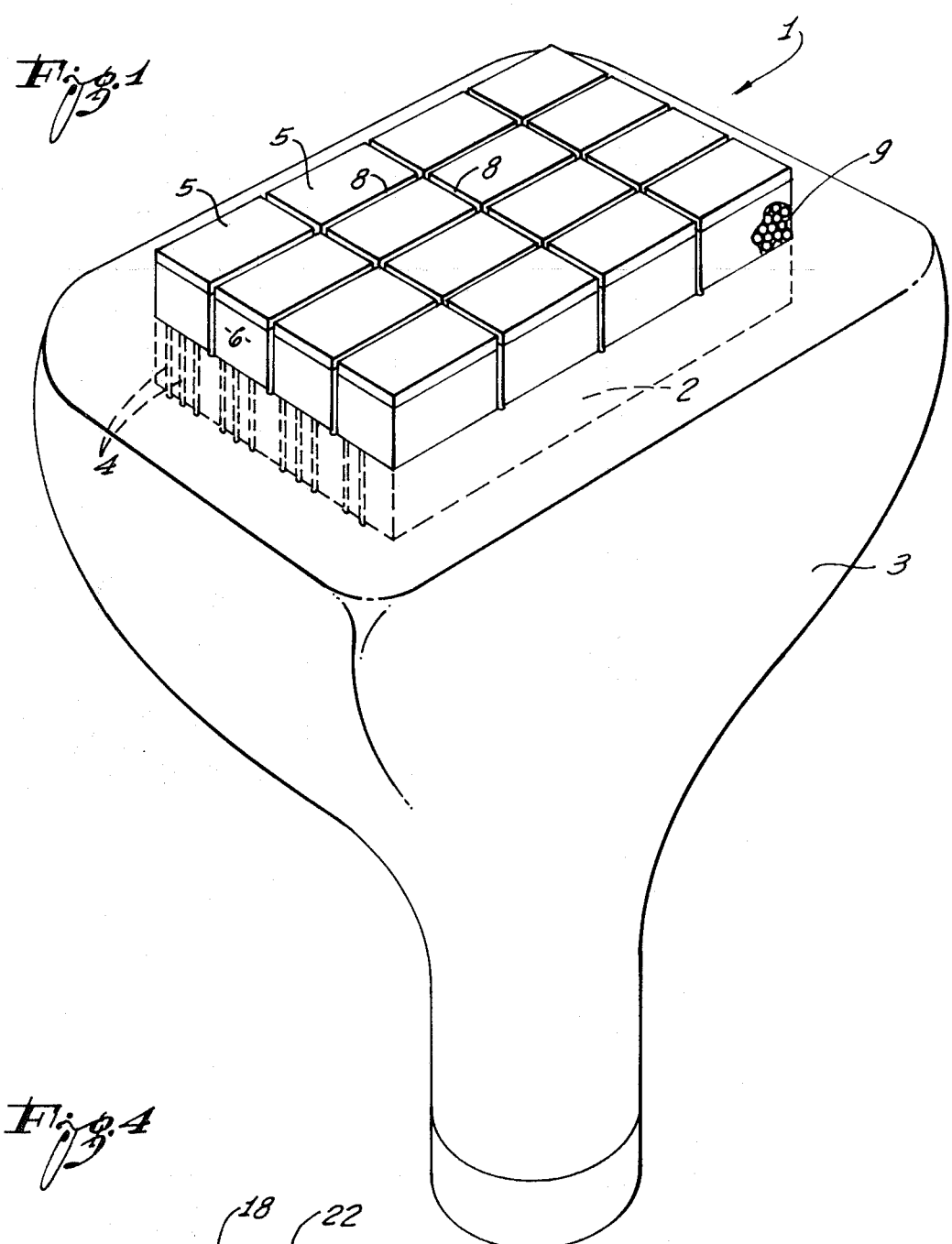

Fig. 2c | Slice Layers to Form Horizontal & Vertical Slots |

INVENTOR
Grant S. Bennett
By Ronald M. Goldman
ATTORNEY

MOSAIC ACOUSTIC TRANSDUCER FOR CATHODE-RAY TUBES

This invention relates to a transducer mosaic and, more particularly, to a mosaic assembly of ultrasonic transducers by which an ultrasonic energy field may be converted into a corresponding field of electrical voltages for use in an image conversion tube combination.

Image conversion systems are used to provide a visible display of visible and, particularly, invisible field patterns. Aptly defined as the description of the physical properties of a give region, the field patterns may be formed of electromagnetic energy, such as light, compressional wave energy such as ultrasonic energy, atomic energy, such as X-ray particles, infrared, electric field, and magnetic fields. One particular system has undergone extensive investigation in recent years- the image conversion system for underwater viewing. In such systems an object submerged in water is illuminated with ultrasonic energy and the reflected ultrasonic field pattern is detected. With suitable display apparatus, the detected signals are converted into a visible image. Other less sophisticated image conversion systems employ ultrasonic energy in a type of scanning sonarradar arrangement and in that way construct a visible display of a submerged object. In each instance the element vital to such system is the image conversion tube which incorporates or has associated therewith acoustic to voltage transducers of suitable resolution.

The Sokolov-type image conversion tube is well described in the literature. Its essential element is the use of a solid slab of piezoelectric material, typically quartz, which, in addition to its acoustic electrical conversion properties, has mechanical properties which permit it to withstand the pressure differential between the vacuum of the tube on one side and ambient pressure on the other side. This latter requirement, however, places a size limitation on the crystal which varies with frequency of the ultrasonic energy used in the system and which, in turn, limits resolution. Typically, the resolution possible from the Sokolov-type tube is limited to 20 lines per inch.

In the Hydrocon image conversion system described in U.S. Pat. No. 3,325,777 a mosaic of transducers are employed. Each transducer is connected through its own circuit, including amplifiers, detectors, etc. to the wire fiber electronics faceplate of an image conversion tube. The tube faceplate is a ceramic plate, an insulator, penetrated by many small wires so that any externally impressed voltages applied to the wires from the transducer appears at the other end of the wire fiber inside the tube. The voltage distribution so formed is "read" by an electron beam within the tube that scans all the wires. Thereafter this information is processed and coupled to a conventional display apparatus. As is apparent, the resolution available in this system is in one instance limited only by the density of wires, the size of the transducer, and the number of transducers in the mosaic.

In the Hydrocon system the conversion tube faceplate is an integral part of the image conversion tube and cannot be removed without requiring the tube to be completely rebuilt. This is also true of the Sokolov tube. As is well known, the individual transducer elements are frequency dependent. To the extent that ultrasonic energy of different frequency ranges are to be employed for "illumination" of the submerged object, a different conversion tube that tailored for use at those frequencies must be provided. This is expensive and cumbersome. An alternative approach used in the laboratory which permits the change of transducer faceplate or "front end" is to have a removable faceplate, although such results in a "leaky" tube, and to maintain a vacuum pump on the tube continuously. Even for use in the laboratory such appears unnecessarily cumbersome and unwieldly.

Previous mosaic designs, such as those used in the Hydrocon system hereinbefore discussed, have assumed that the material in which the transducer elements are embedded approximate the acoustic impedance of the water and are acoustically absorptive so that it simulates an infinite medium. Nonetheless as is apparent in the description of U.S. Pat. No. 3,325,777, the construction of the mosaic and the manner in which it is attached to the wire fiber optics faceplate of the image conversion tube is complex and tedious. To the extent that each transducer must be individually wired to the faceplate an ominous and tedious burden is presented, especially where a system of good resolution might employ thousands of such transducers in a single mosaic.

Therefore, it is an object of this invention to provide a new and useful transducer mosaic useful for converting energy fields into corresponding fields of electrical signals;

It is a further object of the invention to provide an image conversion tube having the simplicity of the Sokolov tube and resolution capability of the Hydrocon tube;

It is an additional object of the invention to provide a transducer mosaic of novel and improved construction; and It is a still further object of the invention to provide a simple and easily assembled ultrasonic transducer arrangement for an image conversion tube;

It is an additional object of the invention to provide a new method of constructing a transducer mosaic. In accordance with the invention a transducer mosaic incorporates a layer of transducing material atop a layer of pressure release material wherein the pressure release material is a conductive syntactic foam. In accordance with another aspect of the invention the foam comprises a mixture of miniscule hollow glass balls and a conductive epoxy resin, for example, in the proportion by weight of 1 to 5. Further, the foam layer is joined to a wire fiber faceplate adapted to be incorporated as the front end of an image conversion tube.

Figure 2B:
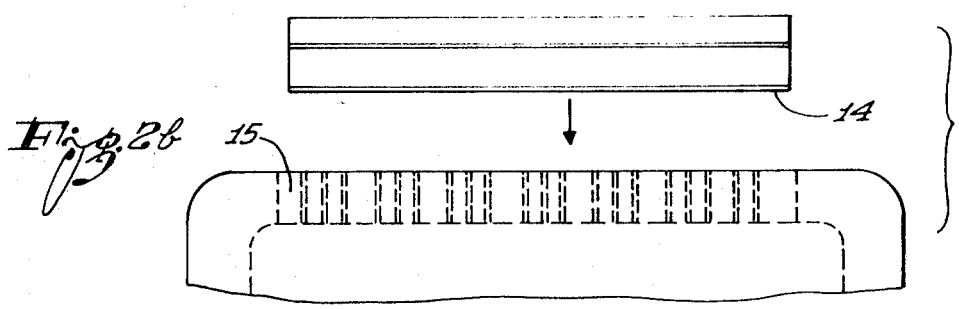
Figure 3:
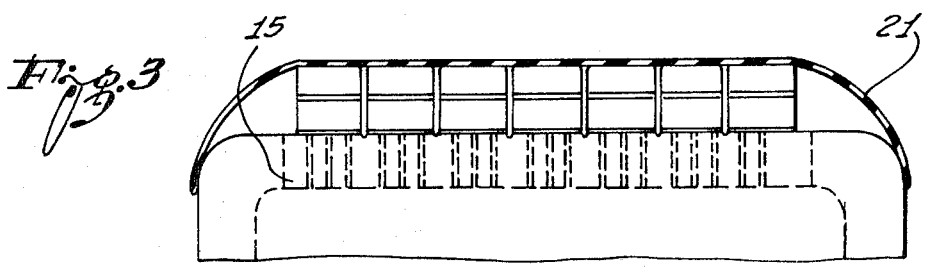

The foregoing and other objects of the invention together with other advantages and features believed to be characteristic of the invention both as to its organization and to its method of operation are better understood from the following detailed description taken together with the figures of the drawing in which:

FIG. 1 illustrates schematically in perspective an image conversion tube embodying the invention;

FIGS. 2a, 2b, and 2c illustrate several steps used in the assembly of a transducer mosaic of the invention;

FIG. 3 illustrates schematically in cross section a side view of the upper portion of an image conversion tube embodying the invention; and, FIG. 4 illustrates a schematic cross section, similar to that of FIG. 3, for an alternative embodiment.

FIG. 1 schematically illustrates the complete image conversion tube which includes the transducer mosaic 1, fiber optics faceplate 2, and the tube body 3. The tube body 3 includes conventional elements, not illustrated, of a pickup device such as the vidicon or orthicon and includes a source of electrons for forming a beam which is used to scan the faceplate and is conventional. Reference may be made to U.S. Pat. No. 3,325,777 and to the literature for greater details. Fiber optics faceplate 2 is represented by the dashed lines as exemplary since it forms the end of the imaging tube body. The faceplate includes a matrix of very fine wires 4 extending therethrough from top to bottom. These wires are insulated from one another by the glass or ceramic material of the faceplate.

Mosaic 1 is attached to and supported by faceplate 2. Mosaic 1 consists of a plurality of insulated piezoelectric elements 5 in the form of a thin slab. The piezoelectric slab is attached to and supported by a pressure release material 6 which in turn is attached to and supported by faceplate 2. For purposes of joining the elements as described a suitable adhesive, suitably conductive epoxy is used. The individual transducers are insulated from one another by a gap or space 8 between each. This gap 8 extends slightly into faceplate 2 and prevents any wire in the faceplate from shorting together any of the individual transducers. The pressure release barrier 6 is a conductive syntactic foam. This is a material which has acoustically absorptive or deadening properties and is electrically conductive. Accordingly, the pressure release barrier provides an electrical path from the bottom side of each piezoelectric slab through to one or more wires 4 on the top of faceplate 2. The faceplate fiber wires provide the electrical path internally of tube body 3 where any voltages presented thereon are available for electron beam scanning or "readout" in the conventional manner. Not illustrated in this figure to complete a functional mosaic, a wax or paraffinlike substance is filled into the slits 8 or an electrically conductive thin foil material covers the top of the transducers. In the latter structure this directly places the entire top side of the individual transducers electrically in common. In the first mentioned approach the common connection is made between the piezoelectric surfaces and the water. As is apparent, most water has sufficient electrical conductivity due to impurities for this application. If desired, the foil may be bonded to the transducer with conductive epoxy or ultrasonic welding techniques. In turn the foil is covered with a thin waterproof material. Alternatively, a thin rubber covering, either electrically conductive or with a thin electrically conductive coating on its inner side, may be placed over the top of the transducer array and tube front to accomplish both functions of waterproofing the transducer and placing the top side of the piezoelectric material 5 electrically in common. In the wax approach, the wax maintains insulation between the individual transducers.

As has been described, the pressure release barrier 6 is a conductive syntactic foam. More particularly, this consists of a cured mixture of conductive epoxy resin and miniscule hollow glass balls. A magnified view of the material is illustrated at 9. A suitable conductive epoxy resin is manufactured by the Hysol Corporation of California and sold under the designation "K-20." This is a two part epoxy in which silver has been added so that, in the cured form, the epoxy is electrically conductive. The other ingredient consists of miniscule hollow glass spheres, called "Eccospheres." The size of the spheres in a given batch varies from about 0.0012 to 0.005 inches (30 to 125 microns) and are about 2-microns wall thickness. This variation is not important and either larger or smaller spheres as available may be used. Glass spheres as specified in this example are available from Emerson-Cummings Co. and are sold under the designation "Eccospheres VT."

A layer of the conductive syntactic foam is manufactured as follows: Approximately 5 parts by weight of the epoxy is thoroughly mixed with 1 part by weight of the glass spheres to form a uniform mixture. The mixture is then packed into a mold of the desired shape, taking care to ensure the filling of all corners in the mold, and allowed to cure or harden. The syntactic foam body is then removed from the mold. Suitably it is found that the foam can be ground, cut, and machined for finishing operations. Additionally, the specific gravity is less than 1-"it floats." In addition, the acoustic velocity in the foam substantially corresponds to that of water. Measurements made with an ordinary ohmmeter on the foam of a few 10ths of an ohm irrespective of the electrode placement. While a very high conductivity is not a requisite or critical factor the cited results are very satisfactory. The slab or layer of material so formed and cut is at this stage represented as slab 10 in FIG. 2a.

The slab of piezoelectric material 12 is suitably Lead Titanate-Lead Zirconate. This is available from Channel Industries under the designation "CH 5400." Piezoelectric layer 12 is then attached to the surface of the syntactic foam slab 10 with a conductive adhesive material 13, suitably the conductive epoxy "K-20," which provides both a firm mechanical bond and electrical continuity. The thickness of the slabs is a matter of design choice. By way of example the thickness of the piezoelectric layer is 0.012 inches and the thickness of the syntactic foam layer is 0.050 inches. Both may be of length and width of 1 inch.

As illustrated in FIG. 2b the assembled transducer is secured to the faceplate 15 of a pickup-type imaging tube. A conductive adhesive 14 suitably epoxy K-20, is spread on either the remaining surface of the foam or the faceplate or both and the foam and faceplate are adhesively joined together. As previously described, faceplate 15 is of a conventional conductive fiber optic construction and consists, preferably, of 2 m. electrically conductive wires 16 in 4-mil centers in a glass or ceramic matrix. It is evident that the assembly described in the alternative may be completed by first securing same to the faceplate 15 before the faceplate is assembled to the imaging tube body.

The imaging tube as thus far formed with attached transducers is mounted in a suitable holding fixture. A saw, not illustrated, is then used to cut slots 18 through the layers to obtain the structure of FIG. 3 and as was illustrated in FIG. 1. The grooves or slots 18 are cut through both horizontally and vertically to form a checkerboard or mosaic of independent ultrasonic transducers. The cut is preferably of a depth at 19 just sufficient to penetrate the fiber optic faceplate 15. The saw used for cutting may be of tungsten carbide as thin as can be obtained. A 0.003 inch thick diamond saw is useful for this purpose.

The front end of the imaging tube is then covered with a thin waterproof rubber sheath 21 having a foil or other conductive coating on its inner surface which places the upper surface of all the piezoelectric elements electrically in common.

Alternatively, instead of a sheath the slots 18 may be filled with a wax or paraffinlike substance 22 shown in FIG. 4. The wax maintains electrical insulation between individual transducers etc. in the mosaic when the imaging tube is submerged in water and the water, almost always containing some impurities, and therefore having sufficient electrical conductivity, acts as the electrical conductor common to the top surfaces of all the piezoelectric slabs. The elements in FIG. 4 similar to those in FIG. 3 are labeled with the same numerals primed. The wax may be added after the first parallel rows of slots are cut to provide mechanical support during cutting of the rows of slots perpendicular to the first. The wax is filled into these latter slots and then the upper surface of the piezoelectric is wiped clean.

It is apparent that an alternative transducer construction in which some of the rows or columns are electrically in common while being significantly decoupled or isolated acoustically, may be accomplished by simply cutting the slot separating those rows or columns to a depth nearly but not completely through the syntactic foam layer.

As apparent, the transducer construction described in this application may be made of any size or shape, large or small, as is desired simply by cutting in the desired manner. Additionally, the materials described may be used as a single transducer without cutting. For example, the properties of the piezoelectric and syntactic foam pressure release barrier herein described are useful without an imaging tube and can be used in other combinations to detect ultrasonic energy in water. The acoustic properties of that combination closely approximate the acoustic impedance of water and therefore make such possible and desirable in other applications.

In operation an ultrasonic energy field is incident upon the sheath, not illustrated, covering the mosaic transducers of FIG. 1. As is conventional, the compressional wave energy distorts or compresses the piezoelectric 5 which in turn develops a voltage across its top and bottom faces proportional in magnitude to the applied stress. The voltages from the bottom surface of the individual transducer faces pass across the attached conductive syntactic foam material 6 to the wire fiber faceplate 2. Depending upon the number of wires 4 in the faceplate covered by the foam material, the voltages pass through faceplate 2 by means of wire or wires 4 to the inside evacuated regions of the imaging tube. The voltages so appearing are scanned or "read" in the conventional manner by the electron beam. As is apparent, because of the groove spacing the transducers, they are isolated from one another both electrically and acoustically.

Should it be desired to replace the transducer mosaic attached to the imaging tube faceplate as illustrated in FIG. 1 with another having perhaps different thicknesses of piezoelectric or foam layers than the original substitution is relatively simple. The piezoelectric and syntactic foam layers being joined to the faceplate with epoxy are simply scrapped off and the faceplate is cleaned with a suitable epoxy solvent. Then a new mosaic is attached to the faceplate in the same manner as described for the bonding of the original. Likewise, the new material is cut with suitable grooves and of such spacing desired in the same manner described for the original.

It is to be understood that the above-described arrangements are intended to be illustrative of the invention and not by way of limitation since numerous other arrangements and equivalents suggest themselves to those skilled in the art and do not depart from the spirit and scope of my invention. Accordingly, it is to be expressly understood that the invention is to be broadly construed within the spirit and scope of the appended claims.

What I claim is:

1. An improved front end for an imaging tube comprising in combination:
   a. A plurality of acoustic transducer means spaced from one another to form a mosaic of transducers, each of said transducer means for converting incident acoustic energy into a corresponding electrical signal;
   b. a plate having a top and bottom surface and containing a plurality of electrically conductive fibers spaced and insulated from one another to form a mosaic of conductive fibers with each of said fibers extending at least between said top surface and bottom surface to permit the passage of electrical voltages therebetween;
   c. a plurality of spaced coupling means, said plurality corresponding in number to said plurality of transducer means, each of said coupling means physically supporting a corresponding one of said transducer means and forming an electrically conductive passage between said corresponding one of said transducer means and at least one corresponding conductive fiber in said plate, each of said coupling means attached on one side to a corresponding one of said transducer means and on another side to said plate, and wherein, each of said coupling means consists of an electrically conductive syntactic foam material.

2. The invention as defined in claim 1 wherein said transducer means comprises piezoelectric material for converting acoustic energy incident thereupon into an electrical signal.

3. The invention as defined in claim 1 wherein said electrically conductive syntactic foam material consists of a mixture of minute hollow glass balls in a matrix of electrically conductive epoxy material.

4. An improved detection device comprising:
   a. a mosaic of spaced acoustic transducer means, each of said acoustic transducer means in said mosaic for converting incident acoustic energy into a corresponding electrical signal;
   b. a fiber wire plate;
   c. said fiber wire plate containing a mosaic of electrically conductive wire fibers therethrough spaced and insulated from one another;
   d. a mosaic of spaced coupling means each of said coupling means physically supporting a corresponding one of said transducer means and forming a electrically conductive passage between one of said transducer means and at least one conductive wire fibers in said plate
   e. each said coupling means supporting on one side an individual transducer means and on its other side attached to said plate, and
   d2. each said coupling means consisting of an electrically conductive syntactic foam material; and
   e. a sheath covering the outer sides of all said acoustic transducer means, opposite from the side thereof connected to said coupling means, said sheath having an electrically conductive surface for placing said outer side of all said transducers electrically in common.

5. The invention as defined in claim 4 wherein said electrically conductive syntactic foam material comprises a mixture of hollow glass spheres and an electrically conductive epoxy material.

6. The invention as is defined in claim 4 wherein said transducer means is a piezoelectric transducer for converting acoustic energy into corresponding electrical signals.

7. An image conversion tube containing a fiber wire faceplate, said fiber wire faceplate containing a mosaic of electrically conductive wire fibers therethrough spaced and insulated from one another; electron beam means for scanning an end of each of said plurality of conductive wire fibers to monitor the presence and magnitude of electrical potentials thereon; a mosaic of spaced acoustic transducer means, each of said transducer means in said mosaic for converting incident acoustic energy into a corresponding electrical signal; a mosaic of spaced coupling means, each of said coupling means physically supporting a corresponding one of said transducer means and forming an electrically conductive passage between one of said transducer means and at least one conductive wire fiber in said faceplate; each said coupling means supporting on one side an individual transducer means and on its other side attached to said faceplate, and each said coupling means consisting of an electrically conductive syntactic foam material.

8. The invention as defined in claim 7 wherein said transducer means is a piezoelectric transducer for converting acoustic energy into corresponding electrical signals.

9. The invention as defined in claim 8 wherein said piezoelectric transducers are thin slabs of piezoelectric material.

10. The invention as defined in claim 7 wherein said conductive syntactic foam consists substantially of a mixture of minute hollow glass spheres and electrically conductive epoxy material.

11. The invention as defined in claim 10 wherein said mixture contains a portion by weight of epoxy material at least twice as great than the portion of glass spheres.

12. The invention as defined in claim 10 wherein said transducer comprises a piezoelectric material for converting incident acoustic energy into a corresponding electrical voltage.

13. The invention as defined in claim 1 wherein each transducer in said mosaic comprises a slab of piezoelectric material.

14. The invention as defined in claim 13 wherein the space between adjacent transducer means and between adjacent coupling means comprises a fill of waxlike material to maintain insulation therebetween when the former is immersed in an electrically conductive fluid.

15. An improved detection device for use in combination with the wire fiber faceplate of a cathode ray detection tube comprising:
   a. piezoelectric transducer means for converting incident acoustic signals into an electrical signal;
   b. coupling means having front sides and backsides, said coupling means attached to and supporting on said front side said transducer means and adapted to be attached on said backside to said wire fiber faceplate for coupling said electrical signals from said front side to said backside;
   c. said coupling means consisting substantially of a mixture of minute hollow glass spheres and electrically conductive epoxy material in which mixture said epoxy material by proportion is approximately twice as great by weight as the portion of said glass spheres; and
   d. conductive epoxy means for securing said coupling means to said transducer means and for securing coupling means to said wire fiber faceplate.

* * * * *

PO-1050
(5/69)

UNITED STATES PATENT OFFICE
CERTIFICATE OF CORRECTION

Patent No. 3,622,825      Dated November 23, 1971

Inventor(s)    Grant S. Bennett

It is certified that error appears in the above-identified patent and that said Letters Patent are hereby corrected as shown below:

In Column 6, line 43, cancel the number "1" and substitute therefor --7--.

Signed and sealed this 16th day of May 1972.

(SEAL)
Attest:

EDWARD M. FLETCHER, JR.
Attesting Officer

ROBERT GOTTSCHALK
Commissioner of Patents